Dec. 17, 1963 N. H. MEYERS 3,114,845

SUPERCONDUCTOR COMMUTATOR CIRCUITS

Filed Aug. 29, 1960 5 Sheets-Sheet 1

INVENTOR
NORMAN H. MEYERS
BY John E. Dougherty Jr.
ATTORNEY

Dec. 17, 1963 N. H. MEYERS 3,114,845

SUPERCONDUCTOR COMMUTATOR CIRCUITS

Filed Aug. 29, 1960 5 Sheets-Sheet 2

Dec. 17, 1963 N. H. MEYERS 3,114,845

SUPERCONDUCTOR COMMUTATOR CIRCUITS

Filed Aug. 29, 1960 5 Sheets-Sheet 4

United States Patent Office 3,114,845
Patented Dec. 17, 1963

3,114,845

SUPERCONDUCTOR COMMUTATOR CIRCUITS

Norman H. Meyers, Poughkeepsie, N.Y., assignor to International Business Machines Corporation, New York, N.Y., a corporation of New York Filed Aug. 29, 1960, Ser. No. 52,724
30 Claims. (Cl. 307—88.5)

The present invention relates to commutator circuits and, more particularly, to superconductor commutator circuits constructed in the form of transmission lines which are operable to produce one or a plurality of series of sequential outputs, and circuits of this type which are controllable to produce such outputs of different duration and in different sequences.

The superconductor commutator and ring type circuits which have been proposed in the prior art have been constructed of a plurality of stages each of which includes a flip flop or trigger circuit which is controlled by another one of the stages in the ring. Examples of such circuits which are programmable to produce outputs in different sequences and having different duration are found in copending applications Serial No. 783,480, filed on December 29, 1958, now Patent No. 3,002,111 in behalf of David J. Dumin and Serial No. 18,627, filed on March 30, 1960, in behalf of J. L. Anderson, both of which are assigned to the assignee of the subject application. These circuits of the prior art, although they exhibit many desirable attributes, are limited in the speed at which they can be operated and, further, require a relatively large number of components, especially where selective or programmable commutator action is required.

In accordance with the principles of the present invention, improved commutator type superconductor circuits are provided which require a small number of components, which are operable at extremely high speeds, and which are capable of producing outputs of different duration and in any one of a number of different sequences. The high speed of operation of these circuits is achieved by constructing the circuits in the form of transmission lines. Certain advantages which can be realized by constructing superconductor circuits in the form of transmission lines, as well as the details of construction of such circuits, are shown and described in copending application Serial No. 16,399, filed on March 21, 1960, in behalf of J. J. Lentz and, Serial No. 16,431, filed on March 21, 1960, in behalf of D. R. Young and J. Swihart, both of which are assigned to the assignee of the subject application. The latter application discloses the manner in which such transmission lines may be constructed to achieve different propagating speeds in the lines.

The advantages realizable by applying the teachings of the present invention to commutator type superconductor circuits are illustrated in the embodiments disclosed herein by way of example. Each of these circuits is constructed in the form of a superconductor transmission line on which a signal or signals are propagated to produce the desired sequential outputs. Control conductors are connected in the transmission line and the outputs are produced on superconductive gate conductors arranged adjacent these control conductors. The sequence in which the outputs are produced is dependent upon the characteristics of the individual control conductors, the characteristics of the signal initially applied to the line, the manner in which the line itself is excited, and the characteristics of the line itself and its terminations. As shown in the embodiments herein disclosed, transmission line commutator circuits are provided which include two groups of control conductors requiring different critical currents to drive their associated gate conductors from a superconducting to a resistive state. Signals are propagated in this line by introducing resistance into a gate conductor which is connected across one end of the line. The other end of the line is shorted so that each wave propagated in the line is reflected at the shorted termination and the current in the line is increased as the reflected wave proceeds back to the input gate conductor. By selectively controlling the magnitude of the current associated with the signal propagated on the line and/or the relationship between the resistance introduced across the end of the line and the characteristic impedance of the line the sequence in which the output gate conductors are driven resistive is controlled. As is illustrated in other embodiments of the invention, commutator circuits are provided in which a pulse, rather than a wave, is propagated completely through a line to repeatedly drive a plurality of output gate conductors between superconducting and resistive states. The characteristics of the outputs realized, both as to sequence and duration, may be controlled by controlling the magnitude of the input pulse as well as its duration. Further embodiments are shown wherein waves are produced in superconductive transmission lines which continue to propagate completely through the line a large number of times. In this way, cyclic type outputs are produced on a plurality of gate conductors which are driven between superconductive and resistive states during each of a plurality of cycles of propagation through the commutator transmission line.

Therefore, it is a principal object of the present invention to provide improved superconductor commutator circuits.

Another object is to provide improved superconductor commutator circuits wherein the commutative outputs are produced in response to signals propagating in a superconductive transmission line.

A further object is to provide an improved superconductive commutator circuit which, once excited is capable of repeatedly producing a series of sequential outputs. More specifically, it is an object of the present invention to produce superconductive commutator circuits in the form of superconductive transmission lines in which an input once applied is effective to produce in the line a signal which propagates repeatedly through the line and as it propagates produces outputs in any one of a number of sequences.

Still another object is to produce superconductive transmission lines which are controllable to produce outputs in different sequences and of different duration.

A further object is to produce superconductor commutator circuits having the above attributes which are capable of operating at high speeds and which are fabricated with a relatively small number of components.

The foregoing and other objects, features and advantages of the invention will be apparent from the following more particular description of preferred embodiments of the invention, as illustrated in the accompanying drawings.

Figures 1, 1A:
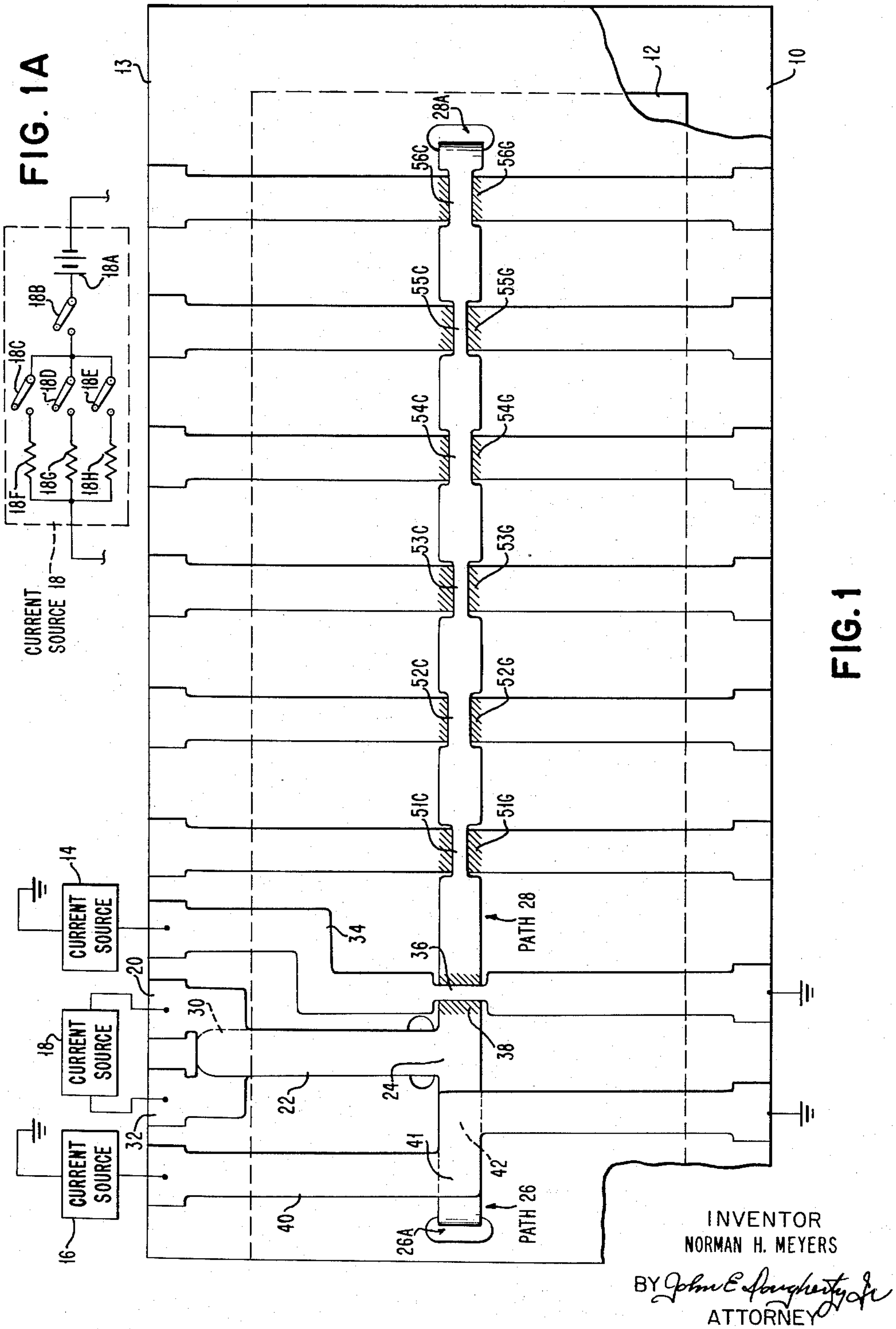
FIG. 1 is a diagrammatic representation of a superconductive transmission line which is excited by driving a superconductive gate conductor at one end of the line from a superconducting to a resistive state.
FIG. 1A is a schematic representation showing the details of a current source employed in the circuit of FIG. 1.

Referring now to the drawings in particular, the commutator circuit of FIG. 1 is formed of a plurality of layers of superconductive material laid down in thin film form on a substrate 10. There is first deposited on the substrate a layer of superconductive material 12 which serves as a shield and which actually forms part of a transmission line. A layer of insulating material 13 is deposited on top of shield 12. The input and outconductors and the other conductor of the transmission line are formed by a plurality of individual superconductive paths which are laid down on top of the shield 12 and insulated from the shield by insulating layer 13 and from each other at points at which they traverse each other by insulating layers not shown. Three current sources 14, 16 and 18 provide the current to control the commutator operation. Current source 18 supplies the current to the transmission line circuit itself; current source 14 applies signals to reset the circuit; and current source 16 provides signals to initiate commutator operations. The transmission line current supplied by source 18 is fed to a land 20 on substrate 10 which is connected to one terminal of this current source. Land 20 is connected by a conductive strip 22 to a terminal 24 from which two paths 26 and 28 extend in parallel. Openings are provided in the insulating layer 13 at 26A and 28A at which points paths 26 and 28 are connected to shield 12. When current from source 18 is in either of these paths it returns in the shield in a path imaging that path to junction 24 and continues in the shield in a path imaging path 24 and via a conductive strip 30 to a land 32 which is, in turn, connected to the other terminal of current source 18.

The transmission line circuit, itself, is similar in construction to that shown and described in copending application Serial No. 16,399, filed on March 21, 1960, in behalf of J. J. Lentz and assigned to the assignee of the subject application. Path 28, together with the shield 12, forms a transmission line along which pulses may be propagated. The circuit may be reset for such an operation by actuating current source 14. This current source is connected to a current path 34 which includes a control conductor 36 that traverses a soft superconductive section 38 of path 28. This soft superconductive section is termed a gate conductor. When current source 14 is actuated, resistance is introduced into path 28 and the entire current from source 18 is directed through path 26. Once this condition has been established, the signal supplied by current source 14 is terminated and the transmission line operation may be begun by actuating current source 16. This very short rise time current source is connected to a current path 40, a portion 41 of which is arranged above a portion 42 of path 26. When source 16 is actuated to provide current in path 40, this fast rise current wavefront rapidly produces a magnetic field which is sufficient to drive the portion 42 of path 26 resistive. When this occurs, a fast rise wavefront is transmitted down the transmission line, formed by path 28 and shield 12. The portion 41 of path 40 is parallel to the portion 42 of path 26 which it controls, rather than as is the usual case, at right angles, in order that a larger amount of resistance may be more easily introduced into path 26. The geometry is such that when current source 16 is energized, the resistance introduced into path 26 is equal to the characteristic impedance of the transmission line formed by paths 28 and shield 12. As a result, the current wavefront that is propagated down the transmission line has a magnitude equal essentially to one half the magnitude of the current supplied by current source 18 and flowing in path 26 at the time current source 16 is energized. This wavefront propagates down the transmission line to the shorted termination at opening 28A where path 28 is connected to shield 12 and is reflected at this termination. The reflected wave builds the current in the line up to the magnitude of the current supplied by source 18 as it propagates from right to left. This wave is terminated at the resistive section 42 of path 26 since the resistance of this section is equal to the characteristic impedance of the line.

Path 28 includes a number of control conductor sections designated 51C, 52C, 53C, 54C, 55C and 56C. Each of these control conductor sections traverses a corresponding gate conductor and these gate conductors are designated 51G, 52G, 53G, 54G, 55G and 56G. These gate conductors provide the outputs for the commutator circuit. The control conductors 51C, 53C and 55C are narrower than the other three control conductors and require a smaller value of current to render them effective to drive the corresponding gate conductors resistive. Illustratively, control conductors 51C, 53C and 55C require four units of current to drive their associated gate conductors resistive, whereas control conductors 52C, 54C and 56C require six units of current to drive their gate conductors resistive.

Current source 18 is capable of selectively applying different values of current to the transmission line circuit. The details of current source 18 are shown in FIG. 1A. The source includes a voltage generation shown in the form of a battery 18A, four switches 18B, 18C, 18D and 18E, schematically represented and three resistors 18F, 18G and 18H. Switch 18B controls the application of current by the source and switches 18C, 18D and 18E control the amount of current supplied by the current source as a whole. When prior to closing switch 18B, one of the switches 18C, 18D or 18E is closed, five units of current are supplied when switch 18B is closed. When two of the switches 18C, 18D and 18E are closed, the source supplies ten units of current under control of switch 18B; and when all three switches are closed, the source supplies fifteen units of current under control of switch 18B.

The value of current supplied by source 18 determines the sequence in which the gates 51G, 52G, 53G, 54G, 55G and 56G are driven resistive when the commutator is operated. If, for example, current source 18 supplies five units of current to the circuit and this current is flowing in path 26 at a time when current source 16 is actuated, the current wavefront initially transmitted from left to right has a magntiude of two and one half units. This current wave therefore does not render any of the control conductors in the transmission line effective to drive its gate conductors resistive. However, when this step is reflected at the shorted termination at 28A, the current in the line builds up from right to left as the reflected step is propagated back along the line, to a value of five units. Gates 55G, 53G and 51G are then driven resistive in sequence, since the control conductors of these gates require only four units of current to drive the gates resistive. Since control conductors 56C, 54C and 52C require six units of current before the critical field for their gates is exceeded, gates 56G, 54G and 52G remain superconducting. After the reflected wave is terminated in the resistive portion 42 of path 26, the current of five units remains stably in the transmission line, holding the gates 51G, 53G and 55G resistive until current source 14 is again actuated to reset the circuit.

When current source 18 supplies ten units of current and this current is flowing in path 26 at a time when current source 16 is actuated, a wave having associated with it a current of five units is propagated from left to right down the line and is then reflected so that the current then builds up in the line from right to left to a value of ten units as the reflected step propagates back to the resistive section 42. In this case, gates 51G, 53G and 55G are driven resistive in this sequence as the initial wave propagates down the line, and then, as the reflected wave propagates back, gates 56G, 54G and 52G are driven resistive in this sequence.

Current source 18 is also capable of selectively applying a current of fifteen units to the line. In such a case, the initial current transmitted down the line, when current source 16 is actuated after the circuit has been reset, has a magnitude of seven and one half units and the current builds up in the line from left to right. The reflected wave builds up the current in the line to fifteen units as it propagates from right to left. As a result of this type of operation, each of the gates 51G, 52G, 53G, 54G, 55G and 56G is driven resistive in sequence as the initial wave is propagated down the transmission line.

Thus, it can be seen that the commutator circuit is capable of providing outputs on selected ones of the output gate conductors in selected sequences in accordance with the value of the current supplied to the circuit by the controllable source 18. The circuit is controllable to provide sequential outputs on only three of the six output gate conductors or on all six of the output gate conductors in two different sequences. It should be noted that the control sections 51C, 52C, 53C, 54C, 55C and 56C, which form a part of the transmission line, have a narrower width than the other portions of the line. In order to preserve the characteristic impedance of the line at the same value, the thickness of the insulating material separating the narrower control conductor sections of path 28 from shield 12 is less than that separating the other wider portions of the path from the shield. Further, the thickness of the insulating material separating the narrower control conductor sections 51C, 53C and 55C from shield 12 is less than the thickness of the insulating material separating the wider control conductor sections 52C, 54C and 56C from the shield. Other methods of preserving the proper impedance along the line will be obvious to those skilled in the art.

In the circuit of FIG. 1 the current paths 40 and 34 actually form transmission line structures with shield 13. In order to prevent unwanted reflections in these lines when pulses are applied by current sources 14 and 16, these transmission lines are preferably terminated in their characteristic impedance as are the transmission lines in the embodiments described below which perform similar functions. Further, the line 40 including control section 41, as shown, is actually inductively coupled to the transmission line commutator formed by paths 26 and 28. This inductive coupling is preferably eliminated, for example, by including in path 40 another section similar to section 41 also inductively coupled to the transmission line commutator but in an opposite sense so that there is no net inductive coupling.

Figure 2:
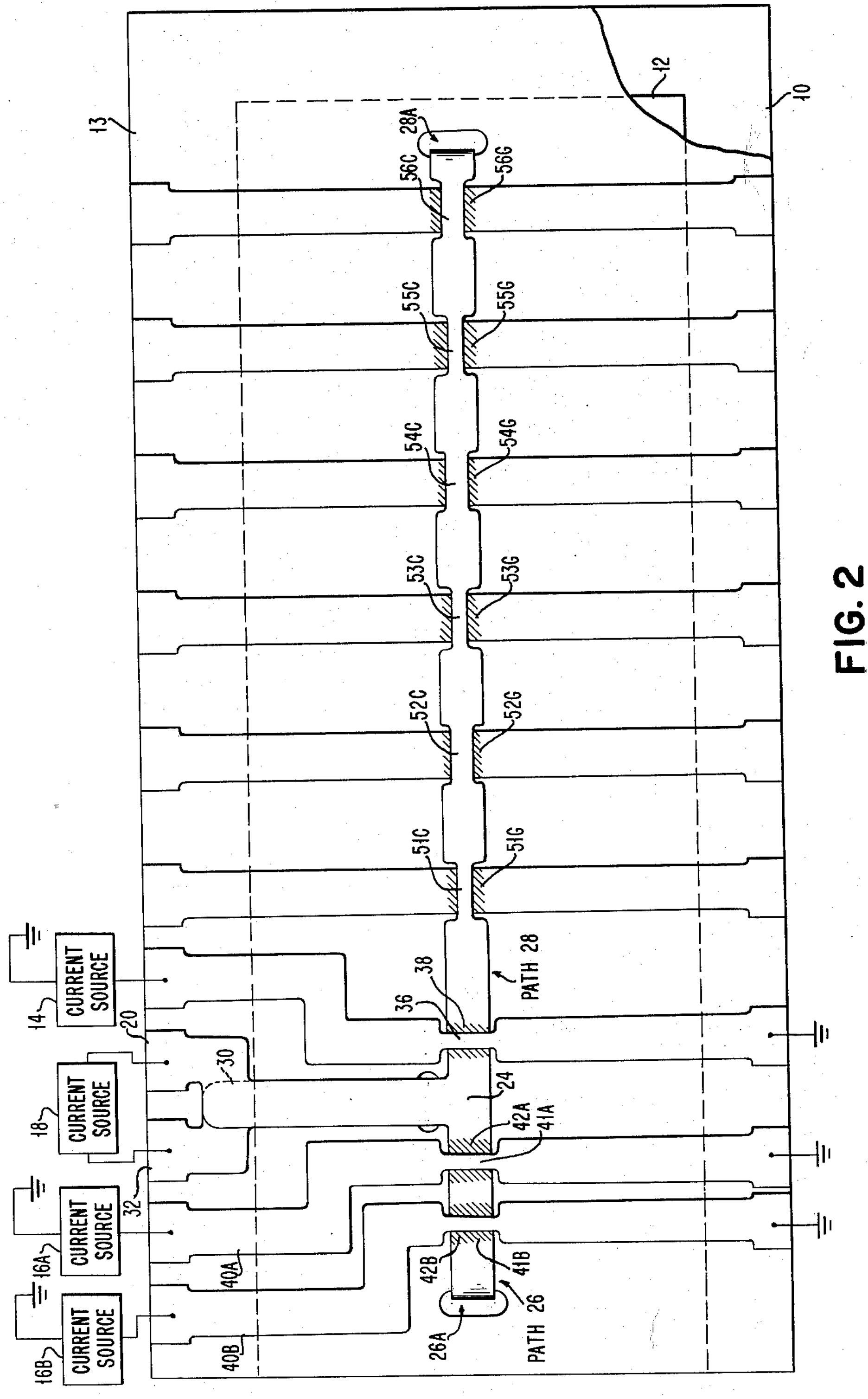
FIG. 2 is a diagrammatic representation of a superconductive commutator circuit similar to that of FIG. 1 wherein two independenly controlled gate conductors are provided at the input or sending end of the transmission line.

FIG. 2 shows an embodiment of a commutator circuit illustrating the manner in which a plurality of gate conductors may be selectively driven resistive in different sequences. This selective operation is achieved by varying the amount of resistance introduced into the input or sending portion of the transmission line circuit. Since the embodiment of FIG. 2 is similar in most respects to that of FIG. 1, like character designations are used in both figures to identify like components. The embodiment of FIG. 2 differs from that of FIG. 1 in that the single input cryotron for sending signals down the transmission line in FIG. 1 has been replaced in FIG. 2 by two separate input cryotrons which are separately controlled by two sources designated 16A and 16B. Fast rise source 16A is connected to a current path 40A which includes a control conductor 41A, that traverses a gate conductor 42A in path 26. Similarly, fast rise current source 16B is connected to a current path 40B which includes a control conductor 41B traversing a gate conductor 42B which is also connected in path 26. Though the control conductors 41A and 41B are shown in FIG. 2 in a more conventional form of a thin cryotron section traversing a wider gate section at right angles, the in line type construction of FIG. 1 may also be utilized. The in line construction has the advantage of making it easier to realize high resistance and, thus, minimize the problems encountered in properly matching the resistance introduced into path 26 to the characteristic impedance of line 26 and line 28. The conventional construction of FIG. 2 is advantageous in that it allows the gate sections to be driven resistive in response to smaller current signals applied to the control sections and there is no coupling between the control and gate sections, though as pointed out above this coupling may be eliminated for in line type devices.

Each of the gate sections 42A and 42B, connected in path 26 of FIG. 2, when driven resistive by the associated control conductor, exhibits a resistance equal to one half the characteristic impedance of the transmission line formed by path 28 and shield 12. If, after current source 14 has been actuated to reset the circuit so that the entire current from source 18 flows in path 26, both of the fast rise current sources 61A and 61B are simultaneously actuated to drive gates 42A and 42B resistive simultaneously, the total resistance introduced into path 26 is equal to the characteristic impedance of the transmission line. When sources 16A and 16B are actuated in this way, the output gate conductors 51G through 56G are driven resistive in the same manner as described above with reference to FIG. 1, in a sequence determined by whether current source 18 is supplying five, ten or fifteen units of current. However, when only one of the sending gates 41A or 41B is driven resistive, the sequence in which the sequence in which the output gates are driven resistive is different. Thus, for example, when the current source 18 is supplying ten units of current to path 26 at a time when fast rise current source 61A is energized to drive gate 41A resistive and thereby introduce into path 26 a resistance equal to one half the characteristic impedance of path 28, a wave is propagated from left to right down the transmission line having associated with it a current of three and one third units. None of the output gates are driven resistive as this wave proceeds from left to right. However, when the wave reaches the shorted termination at 28A and is reflected, the current in the line is increased to six and two thirds units as the reflected wave propagates back from right to left. As a result, each of the six output cryotrons is driven resistive in sequence from right to left as this wave propagates back to the sending cryotron 41A at which point a further reflection is produced to further build up the current in path 26. However, since all of the output cryotrons are resistive, the further reflection does not affect their state.

If the above described operation, with only one of the input cryotrons driven resistive, is performed at a time when current source 18 is supplying a current of fifteen units, the initial wave propagated down the transmission line from left to right has associated with it a current of five units so that as this wave propagates, cryotrons 51G, 53G and 55G are driven resistive in this sequence. When this wave propagating from left to right reaches the shorted termination at 28A, a reflection is produced. The reflected wave causes the current in the line to increase to ten units so that as the reflected wave propagates from right to left gates 56G, 54G and 52G are driven resistive in this sequence.

When only a single one of the current input sources 16A or 16B is actuated to send a current wave down the transmission line at the time when current source 18 is supplying only five units of current, a much longer delay is required before any of the output gates are driven resistive and further, the time which elapses between the time at which the three gates 51G, 53G and 55G are driven resistive and the later time at which the three gates 52G, 54G and 56G are driven resistive is greater than for any of the modes of operation described above.

Figure 3:
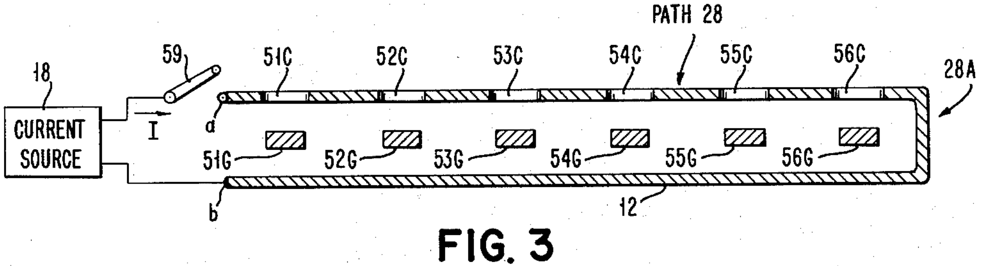
FIG. 3 is a schematic representation of a superconductive commutator circuit which, when operated, is terminated at one end in a short circuit and at the other end in an open circuit.

FIG. 3 shows another embodiment of a superconductor transmission line commutator which is capable of providing outputs different from those realizable with the structures of FIGS. 1 and 2. FIG. 3 is a schematic representation of an end view of a transmission line, such as is shown in FIGS. 1 and 2, formed by path 28 and shield 12, and for this reason, like character designations are used to designate the same components in this figure. For purposes of clarity, the difference in the thicknesses of the insulation 13 between the paths 28 and shield 12 is not shown in the schematic diagram of FIG. 3. The circuit of FIG. 3 is conditioned for operation by closing a switch 59 to apply current from source 18 to the transmission line and waiting until an equilibrium condition with the entire current from the source in the line has been reached. Assuming that source 18 is supplying a current of ten units, each of the output gates 51G through 56G is then resistive. Commutator action is initiated by opening switch 59 and thereby causing a wave having associated with it a current of minus ten units to propagate from left to right down the line. As this wave propagates, the current in the line is reduced to zero and the gates 51G through 56G become superconductive in sequence. When this wave of minus ten units reaches the shorted termination at 28A, a reflection is produced causing a similar wave having associated with it a current of minus ten units to propagate from right to left. This reflected wave, as it propagates, builds the current in the line up to minus ten units, causing the gates 56G, 55G, 54G, 53G, 52G, 51G to be driven resistive in sequence. When the wave of minus ten units reaches the left hand end of the transmission line, it sees an open circuit. As a result, a reflection is produced such that a wave having associated with it a current of plus ten units is propagated from left to right down the line, thereby again allowing gates 51G, 52G, 53G, 54G, 55G and 56G to become superconducting in sequence. When this wave reaches the shorted termination of 28A, a reflected wave having associated with it plus ten units of current is then propagated from right to left and drives the gates 56G, 55G, 54G, 53G, 52G and 51G resistive in sequence. This action continues with each wave propagated from left to right along the line allowing the gates to become superconducting in sequence and each subsequent wave propagated from right to left along the line driving the gates resistive in an opposite sequence. Since the line is entirely superconducting both the shorted termination at the right hand end of the line and the open circuit termination at the left hand end of the line are essentially lossless, this back and forth wave propagation continues for a relatively long period of time without any appreciable attenuation or dispersion. If, in the embodiment of FIG. 3, current source 18 supplies fifteen units of current, the sequence of operation is the same as that described above. However, if current source 18 is actuated to apply only five units of current, only gates 51G, 53G, and 55G are driven between resistive and superconducting states by the wave forms propagating back and forth on the line.

Figure 4:
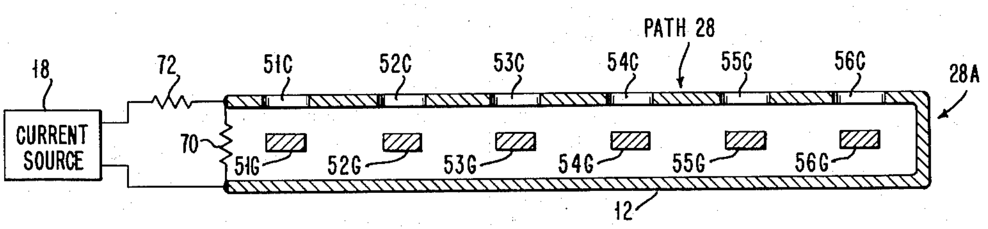
FIG. 4 is a schematic representation of a further embodiment of a superconductive commutator circuit wherein the signals propagated through the line are in the form of pulses.
Figure 4A:
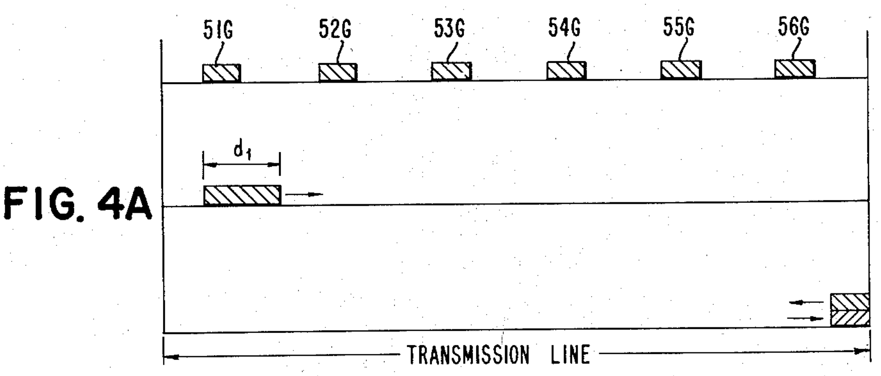
FIGS. 4A and 4B are schematic representations diagrammatically illustrating the pulse propagation of the circuit of FIG. 4.

A further embodiment of the invention is shown in FIG. 4 which is a schematic representation similar to that of FIG. 3 in which like character designations are used to identify like components. In the circuit of FIG. 4, the left hand end of the line is terminated in a resistor 70, the resistance value of which is equal to the characteristic impedance of the transmission line. Pulses to produce the desired commutative action are applied by current source 18 through a resistor 72 which has a large ohmic value compared to that of resistor 70. If the current source 18 applies a current pulse having a magnitude of fifteen current units through the resistor 72, a current pulse is propagated down the transmission line having associated with it a current of seven and one half units. The duration of the applied pulse is controlled by switch 18A of current source 18 (FIG. 1A). As the pulse is propagated from left to right through the control conductors 51C through 56C, gates 61G through 56G are driven resistive. The length of time which each gate is resistive is determined by the duration of the applied pulse. FIG. 4A illustrates the manner in which a pulse having relatively short duration $d_1$ is propagated down the line. This pulse, as shown, has a space duration $d_1$ which is essentially equal to the spacing between the gate conductors so that each gate conductor in sequence becomes superconducting as the next gate conductor is driven resistive. The first representation of the pulse propagating down the line shown in FIG. 4A illustrates its position shortly after source 18 is actuated. At this time gate 51G is resistive and all of the other gates are superconducting. When this pulse reaches the shorted end of the line at 28A, a reflection is produced so that a pulse having associated with it seven and one half units of current is then propagated from right to left. As shown, the leading edge of the reflected pulse overlaps the trailing edge of the originally applied pulse. However, as is indicated in the drawing, this overlap does not occur in a portion of the line in which any of the output control conductors is connected. Thus, when a pulse having a space duration $d_1$ is applied, each of the gates is driven resistive in sequence and is then allowed to become superconducting as the pulse proceeds from left to right; the gates are then driven resistive and become superconducting in an opposite sequence as the reflected pulse proceeds from right to left. The commutative operation comes to an end when the reflected pulse reaches the left hand end of the line which is terminated at resistor 70, the resistance of which is equal to the characteristic impedance of the line.

Figure 4B:
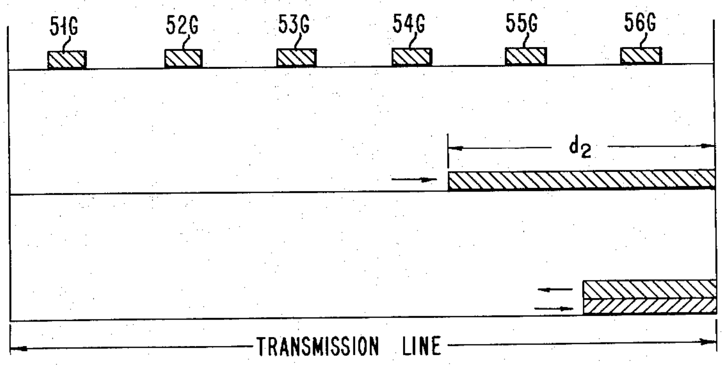

When the current signal applied by source 18 in FIG. 4 has a value of ten units, then the pulse propagating down the line has associated with it a current of only five units so that gates 52G, 54G and 56G are not affected. When the current pulse supplied by source 18 has associated with it a current of five units, and the pulse is a short pulse having a space duration $d_1$; none of the output gate conductors are ever driven resistive. However, if a pulse having a longer space duration such as that illustrated in FIG. 4B is applied, the overlap of pulses at the shorted termination produces a different sequence of outputs. If current source 18 supplies a pulse of fifteen units of current having a space duration such as that illustrated by $d_2$ in FIG. 4B, the gates are driven resistive from left to right in sequence but since this pulse has a space duration greater than the distance between the gates, each gate does not become superconducting until after the second gate succeeding it in the sequence has been driven resistive. When, however, a current pulse of ten units having a space duration $d_2$ is applied, gates 51G, 53G and 55G are driven resistive in sequence as this pulse is propagated from left to right down the transmission line. When the pulse reaches the shorted termination at 28A, the doubling effect achieved due to the overlapping, is sufficient to drive gate 56G resistive, after which, as the pulse proceeds from right to left, gates 55G, 53G and 51G are again driven resistive in this sequence. When the pulse applied by source 18 has associated with it a current of only five units, none of the output gates are driven resistive since the overlapping produces a doubling effect only in the control conductor 56C, which requires six units of current to drive gate 56G resistive. However, by increasing the duration of an applied signal of five units, gate 55G may be driven resistive. Thus, it can be seen that in the embodiment of FIG. 4, the particular ones of the gates which are driven between resistive and superconducting states and the sequence in which switching operations are performed are dependent not only on the magnitude of the applied pulses but also on their duration.

Figure 5:
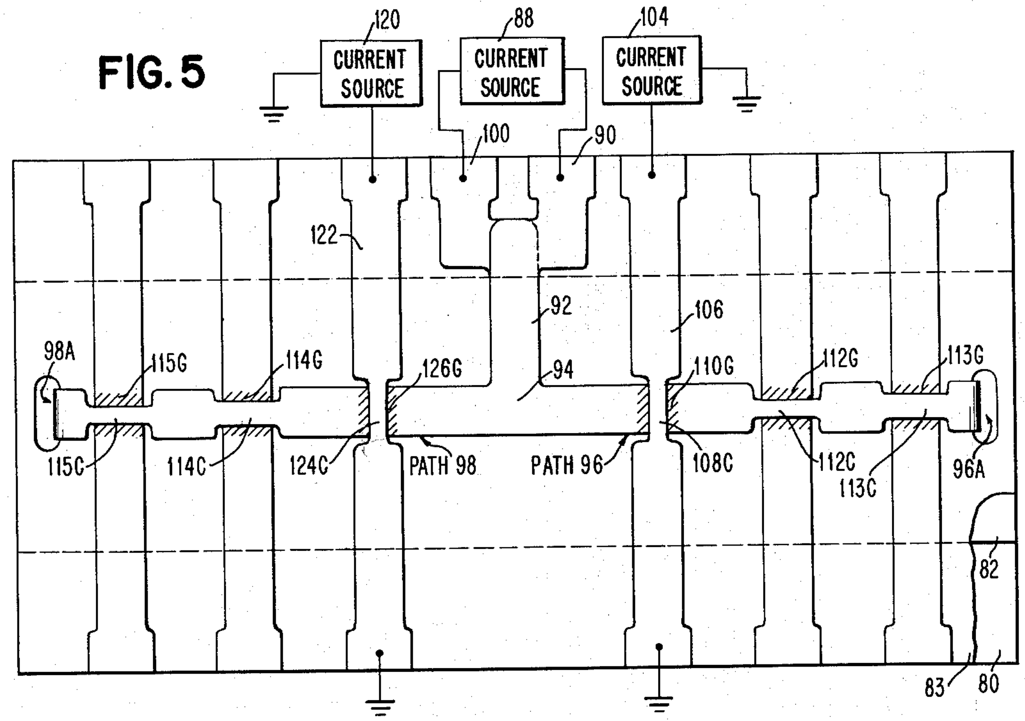
FIG. 5 is a schematic representation of a superconductive transmission line formed by two parallel superconductive paths laid down above a superconductive shield with each path being connected at its end to the shield so that the transmission line is terminated at each end in a short circuit.

FIG.5 shows an embodiment of a circuit constructed in accordance with the psinciples of the subject invention wherein the transmission line for producing the commutative outputs is formed by two essentially identical parallel paths. As in the circuit of FIG. 1, the circuit is constructed by laying down on a substrate 80 a shield 82, an insulating layer 83 and then a plurality of superconductive strips properly insulated one from the other. The current is supplied to the transmission line by a source 88 which is similar to source 18 of the embodiments of FIGS. 1, 2, 3 and 4. One terminal of source 88 is connected to land 90, from where there extends a conductive strip 92 to a junction 94. From this junction two paths 96 and 98 extend in parallel and these paths are connected to the shield 82 at points 96A and 98A at which appropriate openings in the insulating layer 83 are provided. The return path for the current in either of these paths is provided in the shield 82, back to a land 100 which is connected to the other terminal of current source 88. The circuit may be conditioned for operation by actuating a current source 104 to apply a signal to a line 106 which includes a control conductor 108. This control conductor is effective when it drives a gate conductor 110, connected in path 96, from a superconducting to a resistive state. When gate 110 is driven resistive with path 98 superconducting, the entire current from source 88 is directed through the latter path. After this current distribution has been achieved, the current applied by source 104 is terminated.

In order to initiate the propagation of waves in the now completely superconducting transmission line formed by paths 96 and 98 and shield 82, the current supplied by source 88 is abruptly terminated. If, at this time, a current of fifteen units is flowing entirely in path 98, a wave is propagated to the left in path 98, having a current associated with it which reduces the current in this path to seven and one half units. At the same time, a current wave is propagated to the right in path 96 to raise the current in this path to seven and one half units. When these waves propagating in paths 96 and 98 reach the shorted termination at 96A and 98A, identical waves are reflected back in the opposite direction to cause the current in path 96 to be increased to fifteen units and the current in path 98 to be reduced to zero. These waves pass each other at junction 94 after which time the wave propagating from right to left increases the current in path 98 to seven and one half units and the wave propagating from left to right in path 96 reduces the current in this path to seven and one half units. When these waves reach the shorted terminations at 96A and 98A, each path is carrying a current of seven and one half units. The reflection at 98A is such that a current wave then proceeds from this point back from left to right increasing the current in path 98 to fifteen units, whereas the current propagated with the reflected wave from the shorted termination at 96A reduces the current in path 96 to zero. These waves pass each other again at junction 94 and the wave propagating from left to right increases the current in path 96 to seven and one half units and the wave propagating from right to left decreases the current in path 98 to seven and one half units. This operation continues cyclically with the current in each path going in successive steps from zero to seven and one half to fifteen units and then back from fifteen units to seven and one half units to zero units. When the current in one path is being increased to fifteen units, current in the other path is being decreased to zero units; and when the current in one path is being increased to seven and one half units, the current in the other path is being decreased to the same value.

Figure 5A:
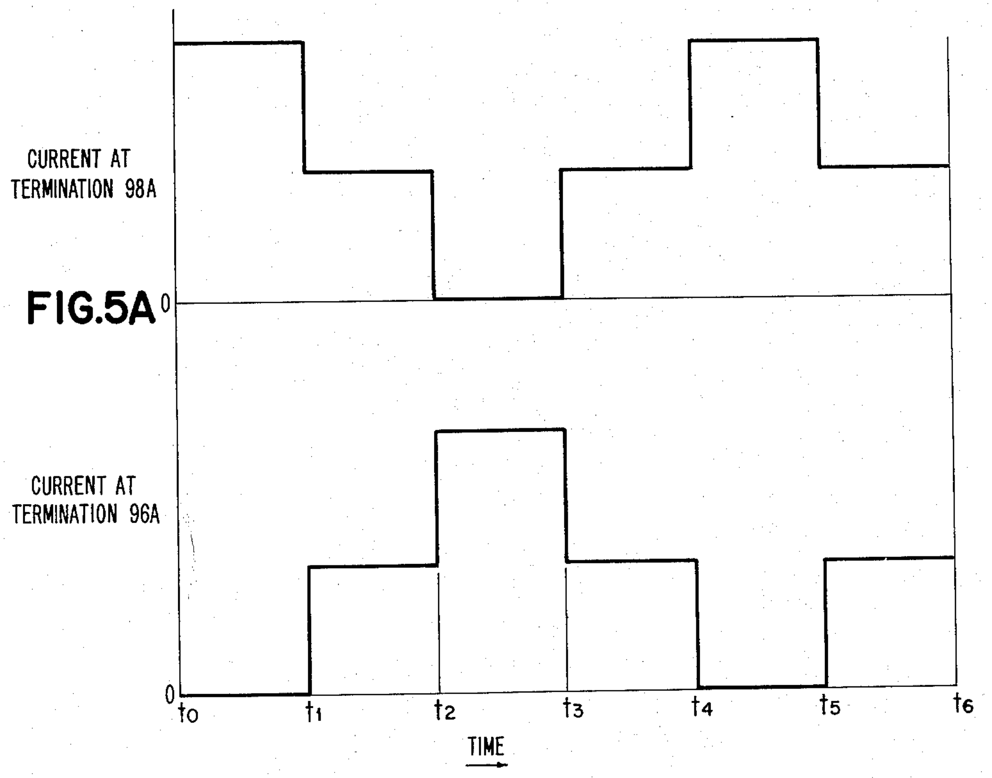
FIG. 5A is a schematic representation of the manner in which the current in the circuit of FIG. 5 is changed as signals are propagated in the line.

The manner in which the current periodically increases and decreases in the transmission line is illustrated in FIG. 5A in which the magnitudes of the currents at the shorted terminations 96A and 96B are plotted as a function of time. Initially, as described above, all of the current from source 88 is in path 98 and at a time $t_0$, the current from this source from this source is abruptly interrupted. When this current is interrupted, pulses are propagated, as explained above, in both directions. At time $t_1$ these pulses reach the terminations 96A and 98A and are there reflected. This operation continues cyclically for a period of time determined only by A.C. losses in the circuit. There are no D.C. losses since the transmission line is constructed entirely of superconductive material and the shorted terminations at 96A and 98A are essentially lossless. The first complete cycle is completed at time $t_4$ at which time the current in the line is the same as at time $t_0$. The time interval for time $t_0$ to $t_4$ is equal to twice the electrical length of the line, that is, it is the time required for a wave initiated at junction 94 to travel through one of the paths 96 or 98 back to the junction and thence through the other path and back to the junction. The outputs of the circuit of FIG. 5 are produced by four output gate conductors 112G, 113G, 114G and 115G which are controlled by control conductors 112C, 113C, 114C and 115C. The control conductors 112C and 115C are narrower than the control conductors 113C and 114C so that the critical control current of the former control conductors is four units and that of the latter control conductors is six units. As a result, each of the control conductors is resistive when the current in the appropriate path is either seven and one half units or fifteen units and are superconducting only when the current is reduced to zero. Prior to the abrupt termination of the current supplied by source 88, gate conductors 114G and 115G are resistive and gate conductors 112G and 113G are superconducting. When the current supplied by source 88 is terminated, that is, at time $t_0$ and waves are propagated from junction 94 to the shorted terminations at 96A and 98A, the state of the gates 114G and 115G are unaffected but the gates 112G and 113G are driven resistive in that order. During the second time increment, gates 112G and 113G remain resistive but gates 115G and 114G are allowed to become superconducting in that order. During the next time increment, $t_2$ to $t_3$, gates 112G and 113G remain resistive and gates 114G and 115G are driven resistive in that order. During the following time increment, $t_3$ to $t_4$, gates 113G and 112G become superconducting in that order and gates 114G and 115G remain resistive. This operation continues cyclically with the gates being successively driven between superconducting and resistive states as long as the wave propagation continues in the essentially lossless line. The wave propagation may be interrupted by actuating a current source 120 to apply current to a path 122 which includes a control conductor 124 arranged to traverse a gate conductor 126 connected in path 98. This gate conductor is chosen to have a resistance equal to twice the characteristic impedance of the transmission line so that the wave propagation in the line is quickly brought to an end when this gate is driven resistive. As stated above, it is preferable to terminate input drive lines such as 122 in their characteristic impedance, and where the construction is such that matching considerations require a relatively high resistance, the in line type gate structure of FIG. 1 is more readily fabricated to exhibit the necessary resistance.

If the circuit of FIG. 5 is operated with the current source 88 supplying only ten units of current, the current in the line is always one step from zero to five to ten units. The gates 112G and 115G are then controlled between superconducting and resistive states in the same sequence as described above, but gates 113G and 114G undergo transitions during different time increments since each of these gates is driven resistive only when the current in the corresponding control conductor is increased to ten units. For this mode of operation during each cycle of four time increments, ($t_0$ to $t_4$) gate 112G is driven resistive during the first time increment and becomes superconducting again during the fourth time increment; gate 115G becomes superconducting during the second time increment and is driven resistive again during the third time increment; gate 113G is driven resistive during the second time increment and becomes superconducting again during the third time increment; and gate 114G becomes superconducting during the first time increment and is driven resistive again during the fourth time increment.

Commutator circuits of the type shown in FIG. 5 may be also constructed in the form of closed rings without any termination. This is accomplished by connecting the paths 96 and 98 to each other instead of to the shield at points 96A and 98A. An embodiment of a circuit constructed in this manner is shown in FIG. 6, wherein like characters are employed to designate like components.

Circuits constructed in this manner to form a closed ring on the superconductor shield are described in the above cited copending application Serial No. 16,399. The ends of the paths 96 and 98 are connected at junctions 94 and 94A. These junctions are connected to lands 90 and 100 which are, in turn, connected to the terminals of current source 88. The current from source 88 is completed through a conductor 91 which is connected to shield 82 through an opening 93 in the shield. There is another opening 93 in shield 82 below conductor 91 to provide a high inductance choke in this path. This circuit may be operated in a manner similar to the circuit of FIG. 5, by establishing waves in the transmission line which repeatedly circulate completely around the line to repeatedly control the output gate conductors between superconducting and resistive states. If we consider, as above, that one time increment is the time required for a wave to propagate from junction 94 in one direction to the end of either path 98 or 96, it can be seen that where in the circuit of FIG. 5, the propagating waves are reflected at the terminations at the end of every other time interval in the circuit of FIG. 6 they pass through each other at the end of every other time interval. In other respects, the operation of the circuit is the same.

Figure 6:
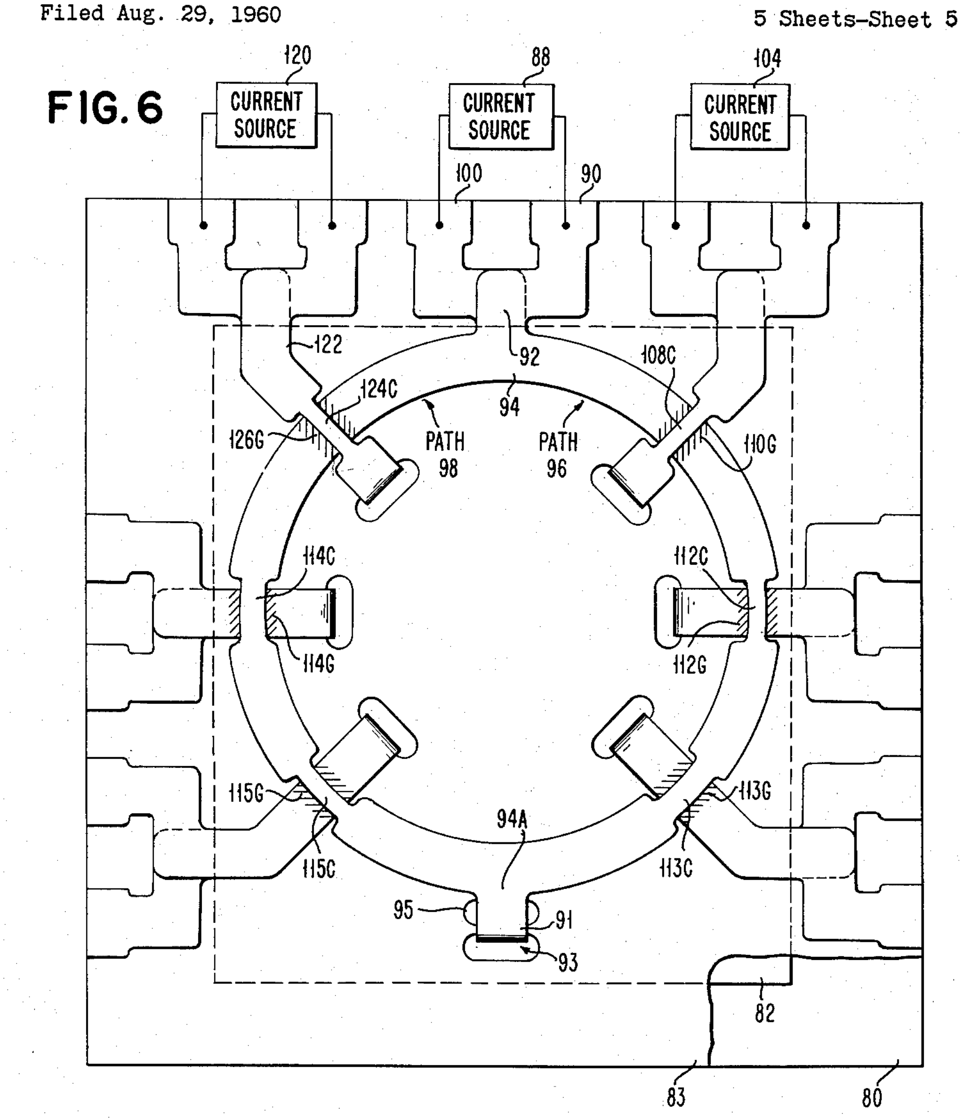
FIG. 6 is a schematic representation of a superconductive commutator circuit in the form of a closed ring laid down above a superconductive shield.
Figure 6A:
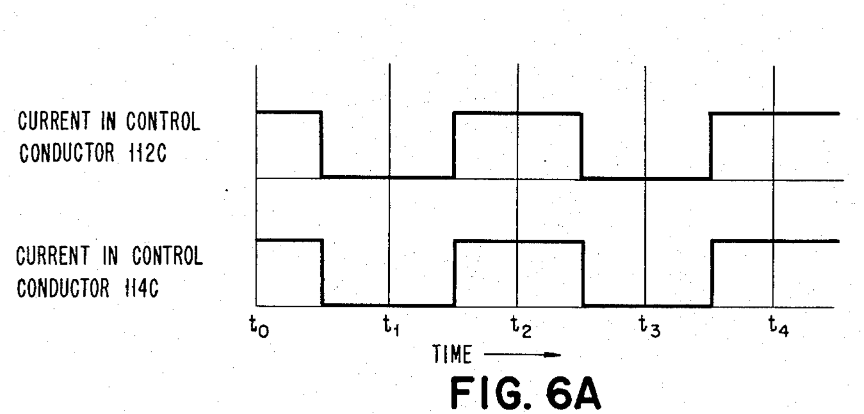
FIG. 6A is a schematic representation of the manner in which the current is changed in the superconductive transmission line of FIG. 6, as signals are propagated in this line.

The circuit of FIG. 6, as well as that of FIG. 5, can also be excited in different ways to produce different signal outputs. For example, the circuit may be excited at a time when the current is evenly distributed between the paths 96 and 98 by abruptly terminating the current supplied by source 88 in which case, during the first time increment waves are propagated to reduce the current in each path to zero. This is illustrated in FIG. 6A in which the current in control conductors 114C and 112C is plotted as a function of time. Initially, there is a current of seven and one half units in each path, and at time $t_0$ the supply current is abruptly interrupted to propagate waves in both directions from junction 94 reducing the current in both paths to zero. During the second time increment, after the waves are reflected in the circuit of FIG. 5, or after the waves pass through each other in the circuit of FIG. 6, the current in both paths is built up to a value equal to one half the supply current. During the third time increment the current in both paths is decreased to zero and during the fourth time increment, the current in both paths is built up to one half the supply current. Thus, it can be seen that superconductor gate conductors controlled by the control conductors connected in the paths are, when the circuit is operated in this mode, initially resistive and are driven superconducting during the first time interval, again become superconducting during the second time interval and become superconducting during the third time interval, etc. This type of oscillation produces sequential outputs on the output gate conductors and continues until the A.C. losses in the circuit reduce the values of the oscillating signals below that necessary to drive the output gates resistive. Since the A.C. losses are small and there are no losses due to terminations in either the circuit of FIG. 5 or that of FIG. 6, this oscillation continues for a time sufficient to produce a large number of sequential outputs.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A superconductor commutator circuit comprising; a superconductive transmission line; first and second superconductive control conductors connected in said transmission line; first and second superconductive output gate conductors each arranged adjacent a corresponding one of said first and second control conductors and each responsive to be controlled between superconducting and resistive states in accordance with the current in the corresponding control conductor; means for producing signals in said transmission line which propagate from one end of said line to the other end of said line and back through said line to said first end; said first control conductor being connected in said line between said means and said second control conductor, whereby said signals propagating from said first end to said second end pass first through said first control conductor and then through said second control conductor and said signals propagating through said line from said second end back to said first end pass first through said second control conductor and then through said first control conductor; said means adapted to apply signals of such magnitude that said signals propagating along said line from said means are effective to cause said second control conductor to drive said second gate conductor from a superconducting to a resistive state and are ineffective to cause said first control conductor to drive said first gate conductor from a superconducting to a resistive state, and said signals propagating along said line back to said means are effective to cause said first control conductor to drive said first gate conductor from a superconducting to a resistive state.

2. A superconductor commutator circuit comprising; a superconductive transmission line; first and second superconductive control conductors connected in said transmission line; first and second superconductive output gate conductors each arranged adjacent a corresponding one of said first and second control conductors and each responsive to be switched between superconducting and resistive states under the control of current in the corresponding control conductor; input means for said transmission line for applying signals to said line which propagate along said line from said input means and thence through said line back to said input means in a predetermined time interval; said input means being controllable to apply to said line either a first signal having associated therewith a first current or a second signal having associated therewith a second current greater than said first current; said first signal when applied to said line by said input means being effective to switch said second output gate conductor between superconducting and resistive states during the first half of said predetermined time interval and to switch said first output gate conductor between superconducting and resistive states during the second half of said predetermined time interval; said second signal when applied to said line by said input means being effective to switch said first and second output gate conductors between superconducting and resistive states in succession during the first half of said predetermined time interval.

3. The circuit of claim 2 wherein said input means includes third and fourth superconductive gate conductors and third and fourth control conductors for controlling the state of said third and fourth gate conductors, and means for selectively energizing either one of said third and fourth control conductors to apply said first signal to said line or both of said third and fourth control conductors to apply said second signal to said line.

4. A superconductor commutator circuit comprising; a superconductive transmission line; first and second superconductive control conductors connected in said transmission line; first and second superconductive output gate conductors each arranged adjacent a corresponding one of said first and second control conductors and each responsive to be switched between superconducting and resistive states under the control of current in the corresponding control conductor; input means for said transmission line for applying signals to said line which propagate along said line from said input means and thence through said line back to said input means; the magnitude of each signal applied by said input means to said transmission line being of such magnitude that it is alone effective to switch the state of each of said first and second output gate conductors, whereby said gate conductors are first switched in a first sequence and thence switched in the opposite sequence.

5. The circuit of claim 4 wherein said transmission line is terminated at one end in its characteristic impedance and its other end in a short circuit.

6. The circuit of claim 4 wherein said transmission line is terminated at one end in an open circuit and at its other end in a short circuit.

7. The circuit of claim 4 wherein said transmission line is in the form of a closed continuous loop.

8. A superconductor commutator circuit comprising; a superconductive transmission line; a plurality of control conductors connected in said transmission line; a plurality of gate conductors each arranged adjacent a corresponding one of said control conductors and each responsive to be switched between superconductive and resistive states under the control of current in the corresponding control conductor; input means for said transmission line for applying inputs at a first point in said line for initiating the propagation of first and second signals in different directions from said first point along said line and thence through said line back to said first point; said first and second signals passing through each other at said first point and continuing to propagate through said line; said signals propagating in said line being effective to first drive said gate conductors from a superconducting to a resistive state in succession, to then allow said gate conductors to again become superconducting in succession, and to then again drive said gate conductors from a superconducting to a resistive state in succession.

9. The circuit of claim 8 wherein said transmission line is shorted at both ends.

10. The circuit of claim 8 wherein said transmission line is in the form of a closed continuous loop.

11. A superconductor commutator circuit comprising; a superconductive transmission line having a predetermined electrical length such that a signal applied to said line propagates through said line in a predetermined time interval; first and second superconductive control conductors connected in said line; first and second superconductive output gate conductors each arranged adjacent a corresponding one of each of said first and second control conductors; said first control conductor requiring a first value of current to drive said first output gate conductor from a superconducting to a resistive state; said second control conductor requiring a second value of current less than said first value to drive said second gate conductor from a superconductive to a resistive state; input means for applying an input to said line which produces signals that repeatedly propagate through said line to repeatedly render said first and second control conductors effective to control said first and second gate conductors between superconducting and resistive states in a time relationship determined by the characteristics of the applied input.

12. The circuit of claim 11 wherein said input means is controllable to apply to said line either a first signal rendering said first and second control conductors effective to control said first and second gate conductors in a first sequence or a second signal rendering said first and second control conductors effective to control said first and second gate conductors in a second sequence different than said first sequence.

13. A superconductor commutator circuit comprising; a superconductive transmission line; first and second superconductive control conductors connected in said line; first and second superconductive output gate conductors each arranged adjacent a corresponding one of each of said first and second control conductors; said first control conductor requiring a first value of current to drive said first output gate conductor from a superconducting to a resistive state; said second control conductor requiring a second value of current less than said first value to drive said second gate conductor from a superconducting to a resistive state; input means for applying to said line inputs which once applied cause signals to be propagated from the point at which the inputs are applied completely through said line back to the point at which the inputs are applied in a predetermined interval; and control means for controlling the inputs applied to said line to thereby control the time during said predetermined time interval at which said first and second output gate conductors are controlled between superconductive and resistive states by said signals propagating in said line.

14. The circuit of claim 13 wherein said control means is effective to apply to said line inputs of different duration.

15. The circuit of claim 13 wherein said control means is effective to apply to said line inputs of different magnitude.

16. The circuit of claim 13 wherein said input signals applied to said line are in the form of pulses whereby during said predetermined time interval one of said output gate conductors is first driven from a superconducting to a resistive state and then allowed to become superconducting again and then the other of said output gate conductors is driven from a superconducting to a resistive state and then allowed to become superconducting again.

17. The circuit of claim 13 wherein said signals are in the form of waves which are effective during said predetermined time interval to first drive said output gate conductors from a superconducting to a resistive state in succession and thereafter to allow said gate conductors to become superconducting in succession.

18. The circuit of claim 13 wherein one end of said transmission line is shorted and said signals applied to said line build up the current in said line during each plurality of time intervals succeeding said predetermined time interval; and said control means is effective to control said input signals so that only said second output gate conductor is driven from a superconducting to a resistive state during said predetermined time interval and said first gate conductor is driven from a superconducting to a resistive state during a selected one of said succeeding time intervals.

19. A superconductor commutator circuit comprising; a superconductor transmission line; means for producing in said line a signal which repeatedly propagates completely through said line; a plurality of control conductors connected in said line; a plurality of output gate conductors each arranged adjacent a corresponding one of said control conductors; whereby said output gate conductors are repeatedly switched in sequence between superconducting and resistive states by said signal as it is repeatedly propagated through said line.

20. The circuit of claim 19 wherein said signals repeatedly propagating in said line in which said control conductors are connected switches said gate conductors from a superconducting to a resistive state in a first sequence and thence from a resistive to a superconducting state in a different sequence.

21. The circuit of claim 19 wherein one end of said transmission line is terminated in a short circuit.

22. The circuit of claim 19 wherein said transmission line is in the form of a closed continuous loop of superconductive material.

23. A superconductor commutator circuit comprising; a superconductive transmission line; first and second superconductive control conductors connected in said transmission line; first and second superconductive output gate conductors each arranged adjacent a corresponding one of each of said first and second control conductors; said first control conductor requiring a first value of current to drive said first output gate conductor from a superconducting to a resistive state; said second control conductor requiring a second value of current less than said first value to drive said second gate conductor from a superconducting to a resistive state; input means for applying to said line an input which once applied causes a signal to be propagated from the point at which the input is applied completely through said line and back to the point at which the input is applied; and means for controlling the duration of said applied input to thereby control whether one or both of said first and second output gate conductors is controlled between superconducting and resistive states as said signal is propagated through said line.

24. A superconductor commutator circuit comprising; a superconductive transmission line; a superconductive control conductor connected in said transmission line; a superconductive output gate conductor arranged adjacent said control conductor; input means for applying to said line an input which once applied causes a pulse to be propagated from the point at which the input is applied completely through said line back to the point at which the input is applied during a predetermined time interval; whereby said pulse propagating through said control conductor causes said gate conductor to first undergo a transition from a superconducting to a resistive state and to then undergo a transition from a resistive to a superconducting state.

25. A superconductor commutator circuit comprising; a superconductive transmission line; a plurality of superconductive control conductors connected in said line; a plurality of superconductive output gate conductors each arranged adjacent a corresponding one of said control conductors; a first group of said control conductors each requiring a first value of current to drive the corresponding gate conductor from a superconducting to a resistive state; a second group of said control conductors each requiring a second value of current less than said first value to drive the corresponding gate conductor from a superconducting to a resistive state; input means for applying to to said line an input which once applied causes a signal to be propagated from the point at which it is applied completely through said line; and means for controlling the duration of said input to thereby control the sequence in which said output gate conductors are controlled between superconducting and resistive states as said pulse is propagated in said line.

26. A superconductor commutator circuit comprising; a superconductive transmission line; a plurality of superconductive control conductors connected in said line; a plurality of superconductive output gate conductors each arranged adjacent a corresponding one of said control conductors; input means for applying to said line an input which once applied causes a signal to be propagated from the point at which the input is applied completely through said line back to the point at which the input is applied during each of a plurality of successive time intervals; whereby said signals change the current in said line in steps from a first value to a second value to a third value and then from said third value to said second value to said first value as they propagate through said line.

27. The circuit of claim 26 wherein one of said control conductors requires a value of current between said first and second values to drive the corresponding gate conductors from a superconducting to a resistive state and another of said control conductors requires a value of current between said second and third values to drive the corresponding gate conductor from a superconducting to a resistive state.

28. The circuit of claim 26 wherein said current is terminated at both ends in a short circuit.

29. A superconductor commutator circuit comprising; a closed ring of superconductive material laid down on a superconductive shield and separated therefrom by a layer of insulating material to form a transmission line; a plurality of superconductive control conductors connected in said closed ring of superconductive material; a plurality of superconductive gate conductors each arranged adjacent a corresponding one of said superconductive control conductors; means for producing in said transmission line signals which propagate around said line a number of times whereby the magnitude of current in said line is successively increased and decreased thereby causing said superconductive gate conductors to be repeatedly driven between superconductive and resistive states.

30. A superconductor commutator circuit comprising; a superconductive transmission line; a plurality of superconductive control conductors connected in said transmission line; a plurality of superconductive gate conductors each arranged adjacent a corresponding one of said control conductors; said transmission line having characteristic impedance; an element connected across one end of said line having a resistance equal to said characteristic impedance; the other end of said line being effective when a pulse propagating in said line is applied thereto to produce a reflection of essentially equal magnitude; and means for applying an input pulse across said element whereby a pulse is propagated down said line to the other end of said line and thence a reflected pulse is propagated back through said line to said element where said pulse is terminated and whereby said superconductive gate conductors are successively driven resistive in a first sequence as said pulse is propagated down said line and are driven resistive in an opposite sequence as the reflected pulse is propagated back through said line to said element.

References Cited in the file of this patent

UNITED STATES PATENTS 2,966,647 Lentz ________________ Dec. 27, 1960